(12) United States Patent
McKerrell et al.

(10) Patent No.: US 9,229,683 B2
(45) Date of Patent: ***Jan. 5, 2016

(54) COMMUNICATION DEVICE INGRESS INFORMATION MANAGEMENT SYSTEM AND METHOD

(71) Applicant: HEWLETT-PACKARD DEVELOPMENT COMPANY, L.P., Houston, TX (US)

(72) Inventors: Graeme McKerrell, Hertfordshire (GB); Peter Saunderson, Herts (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/570,083

(22) Filed: Dec. 15, 2014

(65) Prior Publication Data

US 2015/0120967 A1  Apr. 30, 2015

Related U.S. Application Data

(63) Continuation of application No. 10/938,292, filed on Sep. 9, 2004, now Pat. No. 8,943,241.

(51) Int. Cl.
| | |
|---|---|
| *G06F 13/12* | (2006.01) |
| *H04L 12/28* | (2006.01) |
| *G06F 5/16* | (2006.01) |
| *H04L 12/70* | (2013.01) |
| *H04L 12/851* | (2013.01) |
| *H04L 12/835* | (2013.01) |

(52) U.S. Cl.
CPC  *G06F 5/16* (2013.01); *H04L 47/00* (2013.01); *H04L 47/2441* (2013.01); *H04L 47/30* (2013.01); *G06F 2205/066* (2013.01)

(58) Field of Classification Search
CPC .......................................... H04L 47/00–47/41
USPC ............................................. 710/52; 370/390
See application file for complete search history.

(56) References Cited

U.S. PATENT DOCUMENTS

| 5,987,507 | A | * | 11/1999 | Creedon et al. ............... 709/215 |
| 2002/0026502 | A1 | | 2/2002 | Phillips et al. |
| 2002/0032871 | A1 | | 3/2002 | Malan et al. |
| 2002/0107953 | A1 | | 8/2002 | Ontiveros et al. |
| 2002/0133586 | A1 | * | 9/2002 | Shanklin et al. ............... 709/224 |

* cited by examiner

*Primary Examiner* — Titus Wong
(74) *Attorney, Agent, or Firm* — Hewlett Packard Enterprise Patent Department

(57) ABSTRACT

The components of communication network device ingress systems and methods cooperate to manage information ingress and prevent denial of service attempts. A classifier classifies incoming information. A classification filter filters the information on a classification basis to prevent denial of service. The classification filter includes a classification filter counter for tracking the flow of information associated with the classification filter. A zero value in the classification filter counter indicates that a buffer capacity limit associated with the classification is reached. The counter permits information to flow to a packet buffer if the classification filter counter value is not zero and discards information if the classification filter counter value is zero. In one exemplary implementation the classification filter counter decrements a classification filter counter value when the information is placed in the buffer. The classification filter counter value is incremented when the information is processed out of the buffer.

17 Claims, 5 Drawing Sheets

COMMUNICATION DEVICE INGRESS INFORMATION MANAGEMENT SYSTEM AND METHOD

CROSS REFERENCE TO RELATED APPLICATION

This application claims priority to and is a Continuation Application of U.S. patent application Ser. No. 10/938,292, filed on Sep. 9, 2004, entitled "A COMMUNICATION DEVICE INGRESS INFORMATION MANAGEMENT SYSTEM AND METHOD," the disclosure of which is hereby incorporated by reference in its entirety.

BACKGROUND OF THE INVENTION

1. Field of the Invention

This invention relates to the field of network communication. In particular, the present invention relates to a network communication device (e.g., a switch) ingress system and method.

2. Related Art

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Often these advantageous results are realized and maximized through the use of distributed resources that communicate with each other. However, when significant amounts of information are introduced in a network, problems often rise with establishing and supporting communications. In particular, forwarding a lot of information to a network device for processing can cause a denial of service for that device.

Network systems are being utilized in increasingly more advanced, versatile, and sophisticated applications that require significant network resources. These sophisticated applications typically require significant amounts of information to be communicated by network devices. As part of participating and facilitating communication of general purpose network frames, modern communication devices are often required to process a lot of information internally. If the amount of data to be processed exceeds a network device's capability a variety of detrimental impacts can occur. When the network device is pushed to processing capacity additional information is not able to be processed often resulting in a denial of service in the network device.

There have been various conventional attempts to prevent denial of service in network devices. One way to improve the performance of a communication network device is to increase its processing and storage capabilities. However, increased processing capability is usually expensive, harder to administer, and ultimately has some upper limit. When storage buffers are full, information is typically discarded, often indiscriminately. While this approach may prevent the system from being swamped, there can be information that is very important for proper operation of the network device that is discarded. Components coupled to a communications network often have operational constraints and it is critical to the performance of these devices that certain data be available. When there is an indiscriminate discard, on average some of the important information will be discarded which can impact the integrity of the network device.

Another traditional approach is to assign a priority to particular information for processing. Traditional prioritizing schemes usually have to be enforced network wide often making actual configuration complicated. Typically, a significant amount of resources are expended to ensure that assigned priorities are mapped correctly to one another between protocols and mean the same thing throughout the network. For example, 802.1p priority tagging is limited to 8 priorities and the tags have to be applied throughout the whole network even though the tags are not applicable to some IEEE protocols (e.g., LACP, STP). In addition, it is still possible for a malicious attack to cause a denial of service by sending a large amount of information tagged as high priority.

In another example, MAC based prioritization applies priorities to classes of traffic which can be identified by the MAC address in the packets (e.g., IEEE multicasts including LACP, STP, internal management traffic destined for a network device, etc.). Again it is still possible for a malicious attack to cause a denial of service by sending a large amount of information as a particular high priority frame type. Even with higher granularity prioritization, a malicious attack can cause a denial of service by sending a large amount of information as high priority traffic.

SUMMARY OF THE INVENTION

The present invention is a network communication ingress system and method that facilitates processing of communication information by a network device. The present invention manages incoming information for processing by a communication device. A network communication ingress system and method of the present invention manages the information ingress on a classification basis and prevents ingress information from exceeding a storage capacity assigned to a classification. Managing ingress information in accordance with the present invention assists communication of information between devices in a communication network In one embodiment of the present invention, the components of a communication network device ingress system cooperate to manage information ingress and prevent denial of service attempts on a network device. A classifier classifies incoming information. A classification filter filters the information on a classification basis to prevent denial of service. The classification filter includes a classification filter counter for tracking the flow of information associated with the classification filter. A zero value in the classification filter counter indicates that a storage buffer capacity limit associated with the classification is reached. The counter permits information to flow to a storage segment if the classification filter counter value is not zero and discards information if the classification filter counter value is zero. In one exemplary implementation, the classification filter counter decrements a classification filter counter value when the information is placed in the storage segment. The classification filter counter value is incremented when the information held in an associated storage segment has been fully processed by the network unit. A storage segment buffer temporarily stores the information while a processor is decoding and acting upon it.

In one embodiment of the present invention, a classification filter can be utilized to identify potential denial of service attempts. For example, by maintaining a record of the number of discards for each classification an indication of a potential denial of service situation can be identified. A notification of a potential denial of service can be communicated to a remote system (e.g., a network management system).

DETAILED DESCRIPTION OF THE INVENTION

Figure 1:
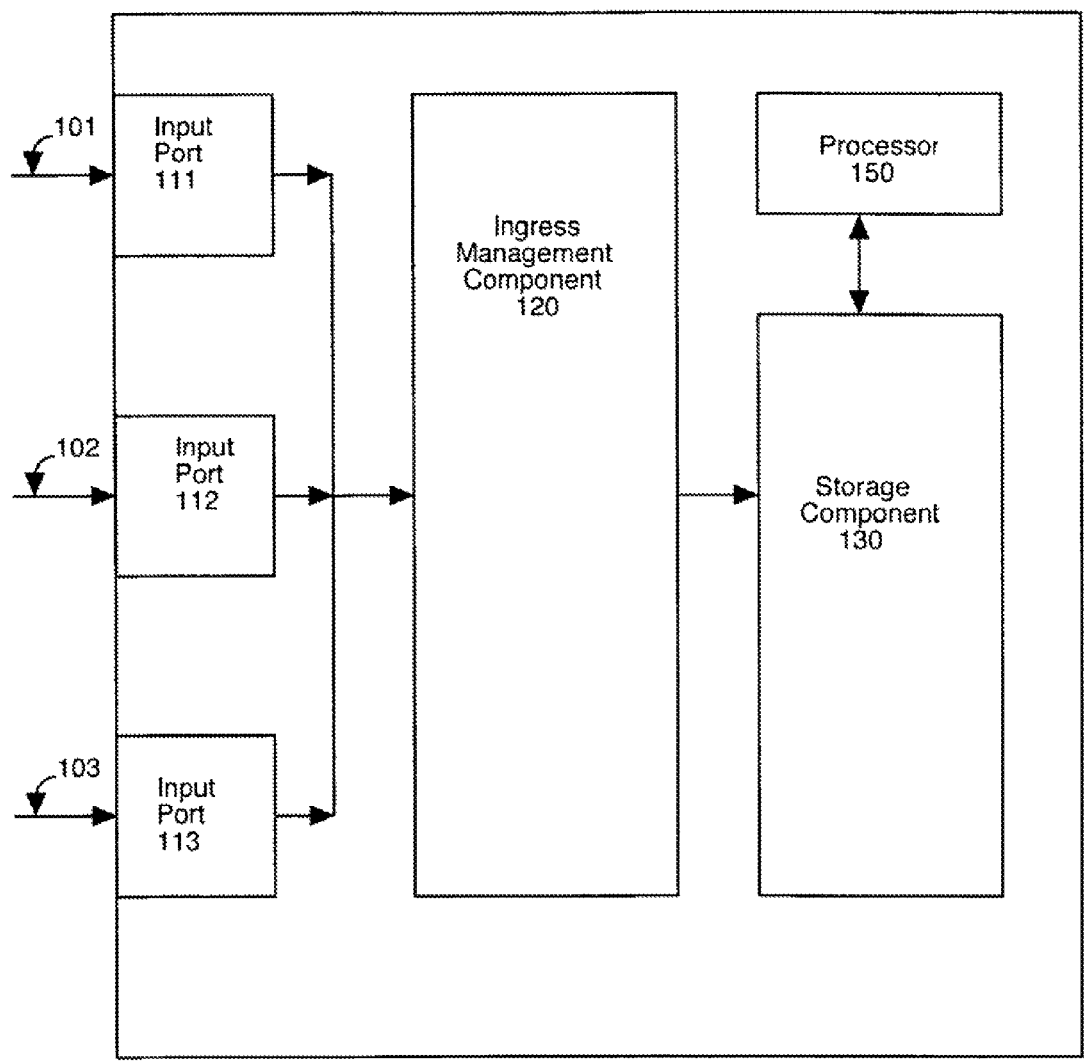
FIG. 1 is a block diagram of a communication device in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing", "computing", "translating", "calculating", "determining", "scrolling", "displaying", "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A communication system and method of the present invention facilitates smooth communication of information in a network while minimizing potential denial of service interruptions. Embodiments of the present invention manage information ingress to communication device storage buffers by tracking the amount of information (e.g., number of packets of information) associated with various classifications that is being communicated to the network device. When the amount of information associated with a particular classification stored in a communication device storage buffer reaches a predetermined limit, additional ingress information associated with the classification is discarded until information associated with the particular classification is removed from the buffer and processed by the device. Since each classification has a predetermined limit that corresponds to a portion of the total storage capacity no single classification of traffic can exhaust the storage resources. The present invention provides a simple extensible scheme that automatically filters the ingress of information packets associated with various classifications to prevent denial of service for information associated with one classification of service by information associated with another classification in a network device.

In one embodiment, incoming information packets associated with a particular classification are written to a storage buffer (e.g., a memory). The number of incoming information packets associated with a particular classification written to a storage buffer minus the number of information packets associated with the particular classification read or removed from the storage buffer is tracked. When a predetermined limit of incoming packets are stored in the buffer further incoming information packets associated with the classification are prevented from being written to the storage buffer. When information packets are read and erased from the storage buffer additional incoming information packets associated with the classification are permitted to enter until the limit is reached again. In one exemplary implementation, a counter for each classification tracks the information packets that are written to and read from the storage buffer. The characteristics of each classification and predetermined storage limits (e.g. initial values of the counters) can be coordinated with the environment in which the present invention communication ingress management system and method are implemented.

FIG. 1 is a block diagram of communication device 100 in accordance with one embodiment of the present invention. Communication device 100 comprises input ports 111, 112 and 113, ingress management component 120, and storage component 130. Input ports 111, 112 and 113 are coupled to ingress management component 120 which in turn is communicatively coupled to storage component 130.

The components of communication device 100 cooperatively operate to manage information ingress by tracking the amount of information (e.g., number of packets of information) associated with various classifications that is being communicated to the network device. Input ports 111, 112 and 113 receive ingress information from inputs 101, 102 and 103 respectively, and forward the ingress information to ingress management component 120. Ingress management component 120 sorts ingress information into various classifications and automatically filters the ingress of information based upon predetermined allocations of storage capacity according to classification type. Storage component 130 stores information for processing by communication device 100. The information ingress management ensures that input to the storage component 130 matches the storage capacity associated with each classification and also the processing ability of the device.

Figure 2:
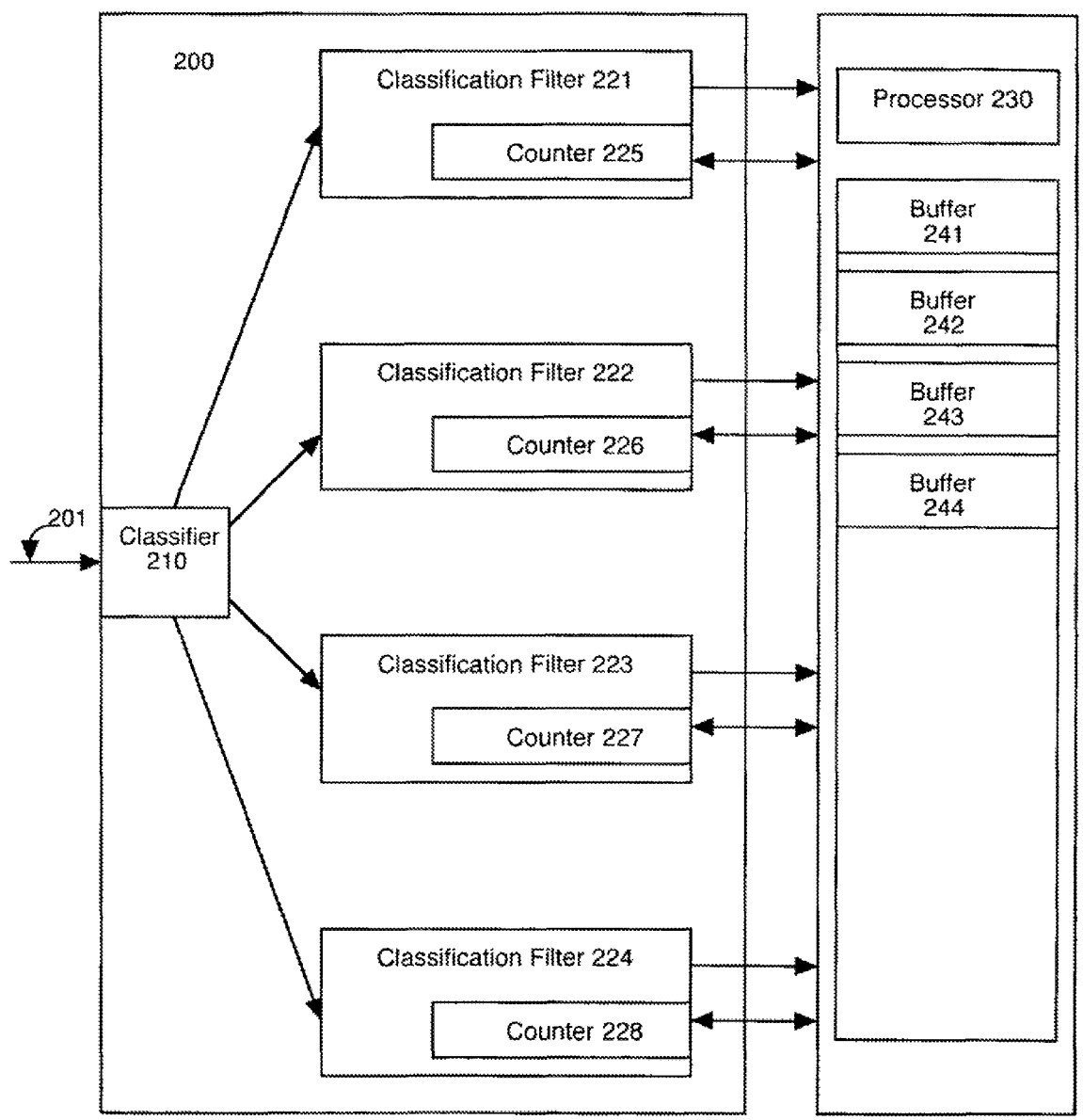
FIG. 2 is a block diagram of an ingress management component in accordance with one embodiment of the present invention.

FIG. 2 is a block diagram of ingress management component 200 in accordance with one embodiment of the present invention. In one exemplary implementation, ingress management component 200 is included in a communication device. Ingress management component 200 comprises classifier 210, and classification filters 221, 222, 223 and 224. Classification filters 221, 222, 223 and 224 include counters 225, 226, 227, 228 respectively. Classifier 210 is coupled to classification filters 221 through 224 which in turn are coupled to storage buffer segments 241, 242, 243 and 244. Storage buffer segments 241, 242, 243 and 244 are coupled to processor 230 and provide information to processor 230.

The components of ingress management component 200 cooperatively operate to manage ingress of information to a communication device. Classifier 210 classifies ingress information. Classification filters 221 through 224 filter the information on a classification basis to prevent denial of service. Classification filters 221 through 224 include counters 225 through 228 for tracking the flow of information associated with each respective classification filter. Storage buffer segments 241 through 244 temporarily store the information. Processor 230 reads and processes the information from the storage buffer segments.

In one embodiment of the present invention, counter values are adjusted as information packets enter and leave storage buffer segments 241 through 244. In one exemplary implementation, the initial value of the counter corresponds to a predetermined maximum amount of storage buffer space allocated to a particular classification. Classification filter counters 225 through 228 decrement a classification filter counter value when an information packet associated with a corresponding classification is placed in the storage buffer segments (e.g., 241 through 244). Classification filter counters 225 through 228 increment a classification filter counter value when an information packet corresponding to the classification is processed out of the storage buffer segments. A zero value in a classification filter counter 225 through 228 indicates that a limit of information associated with the classification is reached. The classification filters 221 through 224 permit information to flow to a storage buffer segment if the values of corresponding classification filter counters is not zero. The classification filters 221 through 224 prevent information flow to a storage buffer segment if the values of corresponding classification filter counters is zero. For example, the classification filters discard information if the classification filter counter value is zero.

In one embodiment of the present invention, a classification filter can be utilized to identify potential denial of service attempts. For example, by maintaining a record of the number of discards for each classification an indication of a potential denial of service situation can be identified. A notification of a potential denial of service can be communicated to a remote system (e.g., a network management system).

Figure 3:
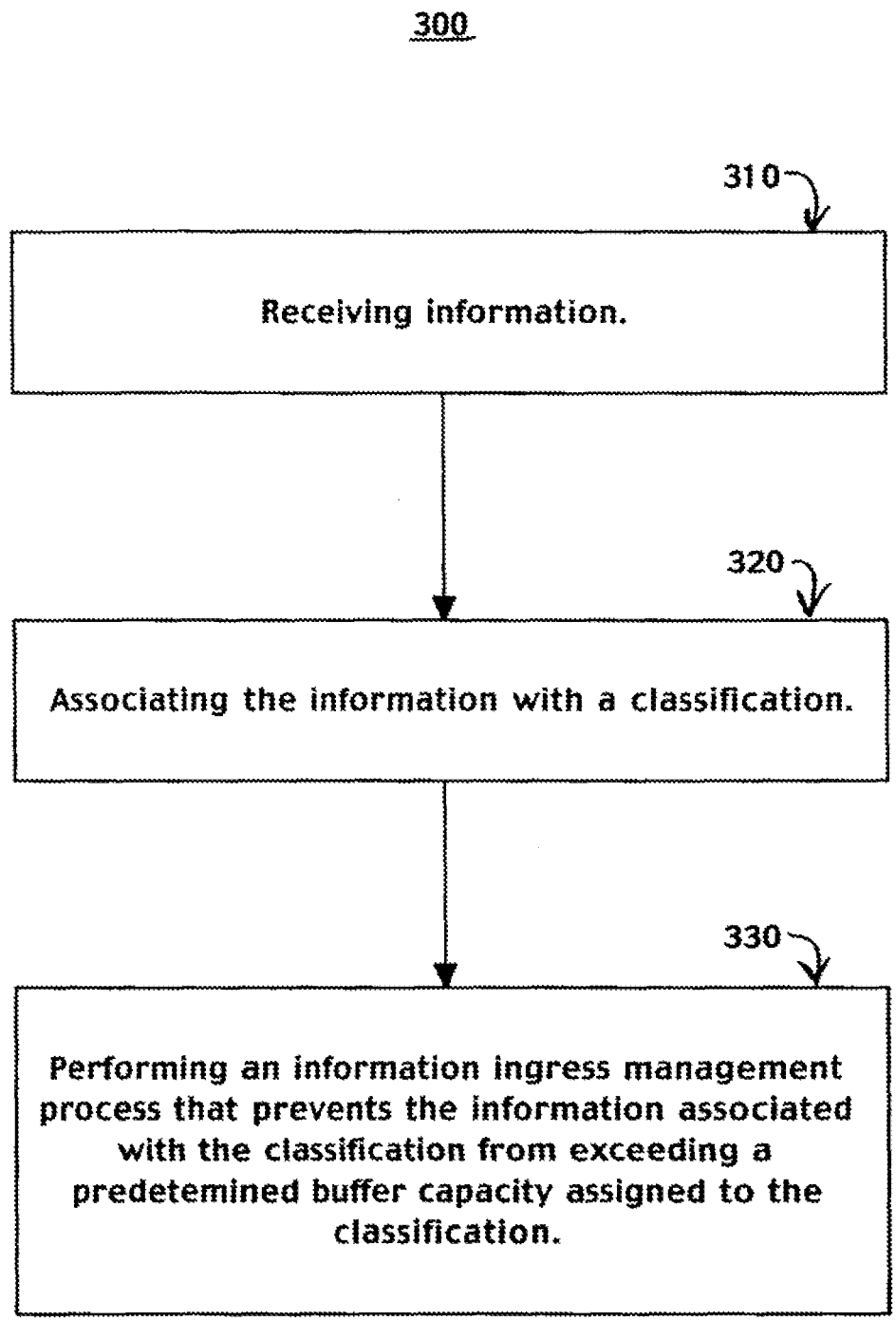
FIG. 3 is a flow chart of a communication ingress filtering method in accordance with one embodiment of the present invention.

FIG. 3 is a flow chart of a communication ingress filtering method 300 in accordance with one embodiment of the present invention. Communication ingress filtering method 300 facilitates smooth processing of information by a network device while minimizing potential denial of service interruptions within the device. For example, communication ingress filtering method 300 manages information ingress to communication device storage buffers by tracking the amount of information (e.g., number of packets of information) associated with various classifications that is being communicated to the network device.

In step 310, information is received. In one embodiment, information is received on a plurality of input ports of a communication device (e.g., communication device 100).

At step 320, the information is associated with a classification. The characteristics of each classification and predetermined storage buffer limits (e.g. initial values of the counters) can be coordinated with the environment in which the present invention communication ingress management system and method are implemented. In one exemplary implementation, the initial values of the counters are programmed with initial values based upon factors corresponding to the particular traffic classification. For example, the factors can include typical communication burst size of a protocol associated with the classification, number of ports through which information packets can ingress into a device, number of other devices included in a network, etc. The initial value can be static or dynamically adapted.

An information ingress management process that prevents the information associated with the classification from exceeding a predetermined storage buffer capacity assigned to the classification is performed in step 330. In one embodiment of the present invention, the ingress management process includes passing the information to a storage buffer if the predetermined amount corresponding to the storage buffer capacity is not reached. In one exemplary implementation, the information ingress management process discards additional information on a classification basis if the predetermined storage buffer capacity is reached.

Figure 4:
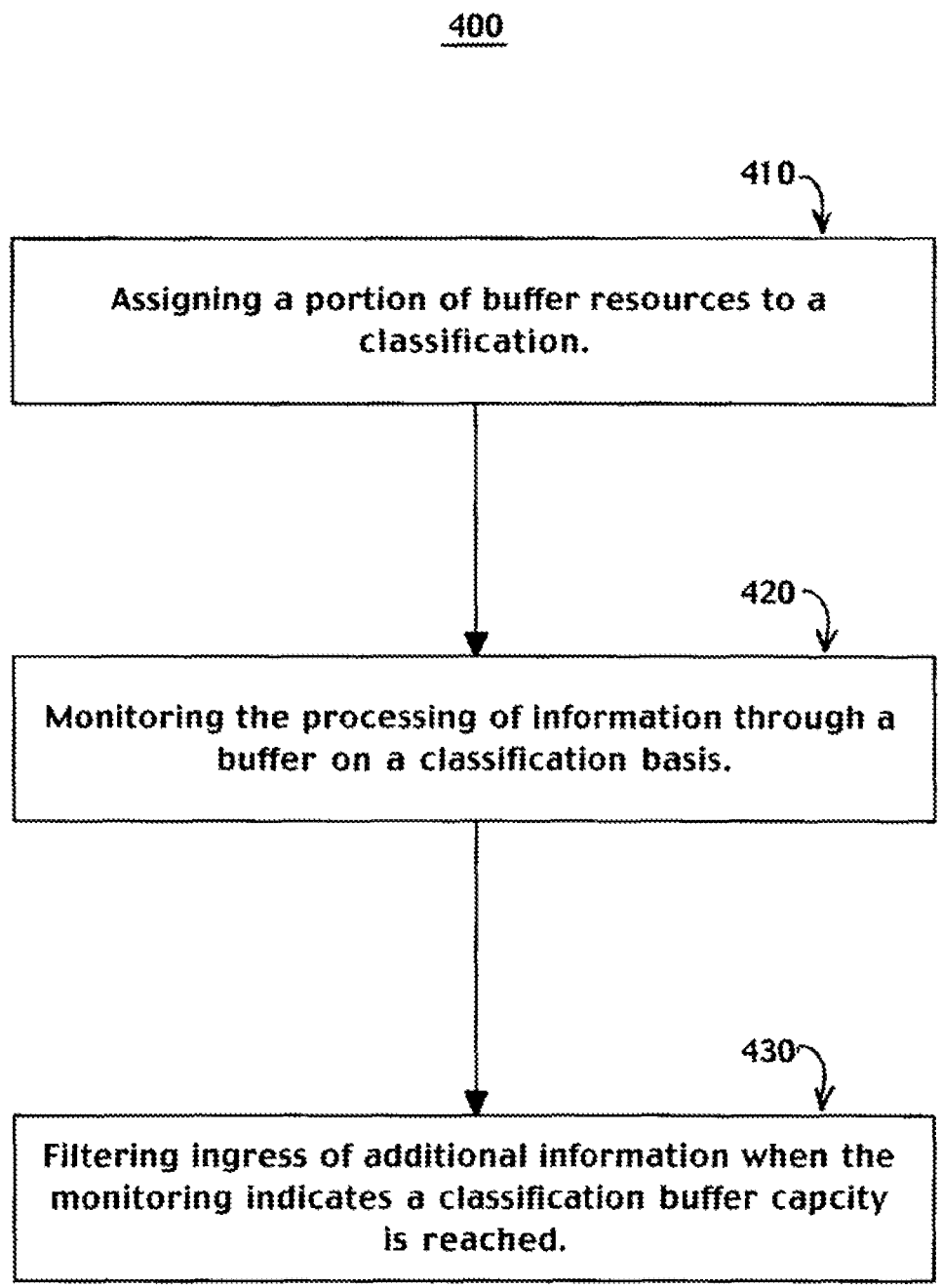
FIG. 4 is a flow chart of an exemplary information ingress management process in accordance with one embodiment of the present invention.

FIG. 4 is a flow chart of information ingress management process 400 in accordance with one embodiment of the present invention. In one embodiment, the number of information packets ingressing minus the number of information packets processed from a storage buffer is tracked. When a predetermined limit of ingress packets are stored in the storage buffer further ingress information packets are prevented from entering the storage buffer. When information packets leave the storage buffer additional ingress information packets are permitted to enter until the limit is reached.

In step 410, a portion of storage buffer resources are assigned to a classification. In one embodiment, the amount of storage buffer resources assigned to a classification corresponds to the characteristics or attributes of information associated with the classification. For example, if a classification is associated with important information more storage buffer resources are assigned to the classification.

In step 420, processing of the information through a storage buffer is monitored on a classification basis. In one embodiment, the information ingress management process includes initializing a classification filter counter value. The initial classification counter value corresponds to the amount of resources assigned to a classification. Information is placed in a storage buffer if the classification filter counter value is not zero. The classification filter counter value is decremented when the information is placed in the storage buffer and incremented when the information is processed out of the storage buffer. The information is discarded if the classification filter counter value is zero.

At step 430, ingress of additional information is filtered when the monitoring indicates a classification storage buffer capacity is reached. For example, the additional information is discarded on a classification basis.

Figure 5:
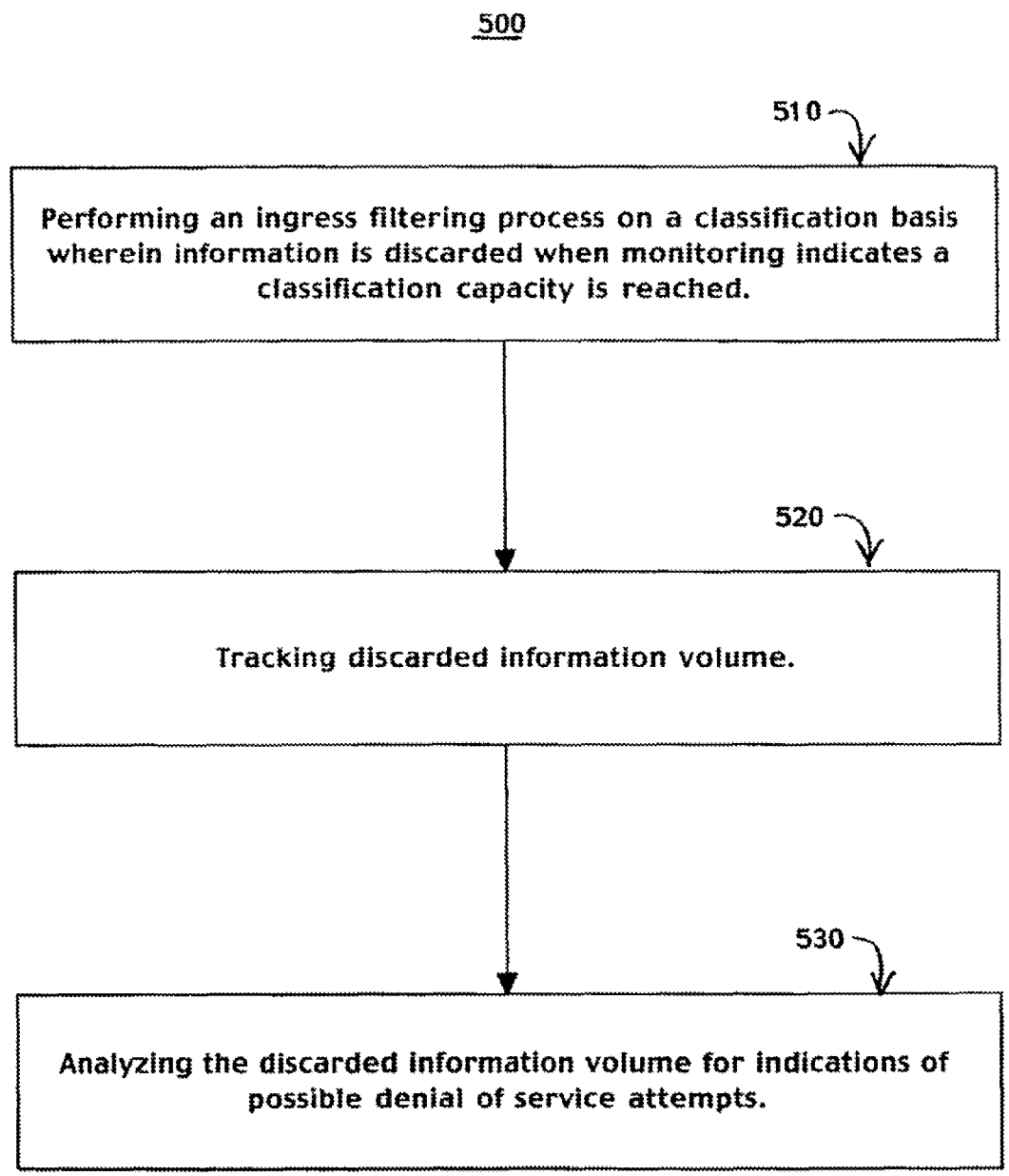
FIG. 5 is a flow chart of a denial of service prevention method in accordance with one embodiment of the present invention.

FIG. 5 is a flow chart of a denial of service prevention method 500 in accordance with one embodiment of the present invention. Denial of service prevention method 500 facilitates detection of denial of service attempts on a network device. For example, denial of service prevention method 500 provides an indication if a network device is being "swamped" with a lot of information associated with a particular classification.

In step 510, an ingress filtering process is performed on a classification basis wherein information is discarded when monitoring indicates a classification capacity is reached and processed by classification. In one exemplary implementation, an initial classification capacity count value is programmed. The initial classification capacity count can be dynamically changed. The count value is changed based upon a number of information packets associated with a classification being communicated.

In step 520, discarded information volume is tracked. In one embodiment, a count of discarded packets associated with each classification is maintained.

In step 530, the discarded information volume is analyzed for indication of possible denial of service attempts. In one exemplary implementation, if an unusually high amount of inform information packets associated with a classification are discarded, a denial of service warning is generated. In one embodiment, a denial of service warning is communicated to a remote control center.

Thus, the present invention facilitates communication of information to a network unit while minimizing denial of service problems. The present invention prevents information associated with a classification from occupying more than a desired amount of storage resources and clogging the flow of information through a communication device. Even though some information for a particular classification may get discarded if a classification count indicates storage space assigned to the classification is full, information from that classification can not cause a denial of service for other classifications of information.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A communication device comprising:
a plurality of input ports to receive packets;
a storage component containing a plurality of storage buffer segments, wherein the storage buffer segments are each assigned to one of a plurality of classification types;
an ingress management component coupled to the plurality of input ports and the storage component, wherein the ingress management component includes:
a classifier to classify each of the packets received through the plurality of input ports into one of the plurality of classification types based upon information in the packets;
classification filters to write the packets into corresponding ones of the plurality of storage buffer segments based upon the classification types of the packets;
counters respectively associated with the classification filters, wherein each of the counters is to be decremented each time the associated classification filter writes a packet into a corresponding storage buffer segment; and
a processor to process packets from the plurality of storage buffer segments.

2. The communication device of claim 1, wherein each of the classification filters is further to determine whether the corresponding counter is at a predetermined limit and to discard the packet in response to the corresponding counter being at the predetermined limit.

3. The communication device of claim 2, wherein the predetermined limit is zero.

4. The communication device of claim 2, wherein the ingress management component is further to analyze the discarded packets to determine whether a denial of service attempt is occurring.

5. The communication device of claim 4, wherein the ingress management component is to count the number of discarded packets for each of the plurality of classification types to determine whether a denial of service attempt is occurring.

6. The communication device of claim 1, wherein the counters are further to be incremented when the associated packets written to the corresponding storage buffer segments are processed.

7. The communication device of claim 1, wherein the counters for each of the corresponding classification filters has an initial value that corresponds to a predetermined maximum amount of storage buffer space allocated to the classification type corresponding to the storage buffer segment.

8. The communication device of claim 1, wherein the classification filters are to write the packets only to respective ones of the plurality of storage buffer segments that are assigned classification types that match the classification types of the packets.

9. The communication device of claim 1, wherein the counters are to be decremented irrespective of the input port through which the packet to be written was received.

10. A communication device comprising:
a processor; and
a memory on which is stored machine readable instructions that cause the processor to:
classify each of a plurality of packets received through a plurality of input ports into one of a plurality of classification types based upon information in the packets;
assign each of the plurality of packets to be written into one of a plurality of storage buffer segments that is assigned to a classification type that matches the classification type of the packet, wherein each of the plurality of storage buffer segments is assigned to one of the plurality of classification types; and
decrement a counter associated with a respective one of the plurality of storage buffer segments each time a packet is written into the respective storage buffer segment.

11. The communication device of claim 10, wherein the machine readable instructions are further to cause the processor to determine whether the counter for a respective storage buffer segment is at a predetermined limit and to discard the packet that has been assigned to be written into the respective storage buffer segment in response to the counter for the respective storage buffer segment being at the predetermined limit.

12. The communication device of claim 11, wherein the machine readable instructions are further to cause the processor to analyze the discarded packets to determine whether a denial of service attempt is occurring.

13. The communication device of claim 12, wherein to determine whether a denial of service attempt is occurring, the machine readable instructions are further to cause the processor to count the number of discarded packets for each of the plurality of classification types and to determine that a denial of service attempt is occurring in response to the number of discarded packets for a classification type exceeding a predefined value.

14. The communication device of claim 10, wherein the machine readable instructions are further to cause the processor to increment the counters when the associated packets written to the respective storage buffer segments are processed.

15. A non-transitory computer readable storage medium on which is stored a set of instructions that when executed by a processor cause the processor to:
   access packets received through a plurality of input ports;
   classify the packets received through the plurality of input ports into one of a plurality of classification types based upon information in the packets;
   write each of the packets to a corresponding one of a plurality of storage buffer segments that is assigned a classification type that matches the classification type of the packets; and
   decrement counters respectively associated with the storage buffer segments each time a packet is written into the associated storage buffer segment.

16. The non-transitory computer readable storage medium of claim 15, wherein the set of instructions are further to cause the processor to:
   determine whether the counter for a respective storage buffer segment is at a predetermined limit and to discard the packet that has been assigned to be written into the respective storage buffer segment in response to the counter for the respective storage buffer segment being at the predetermined limit; and
   analyze the discarded packets to determine whether a denial of service attempt is occurring.

17. An ingress management component comprising:
   a classifier to classify packets received through a plurality of input ports into one of a plurality of classification types based upon information in the packets;
   a plurality of classification filters to write each of the packets to a corresponding one of a plurality of storage buffer segments that is assigned a classification type that matches the classification type of the packets; and
   a plurality of counters respectively associated with the storage buffer segments, wherein the plurality of counters are to be decremented each time a packet is written into the associated storage buffer segment.

* * * * *